(12) United States Patent
Bochmann et al.

(10) Patent No.: US 6,332,070 B1
(45) Date of Patent: Dec. 18, 2001

(54) METHOD AND DATA RECEIVER DEVICE FOR RECEPTION OF A RADIO SIGNAL CONTAINING CORRECTION DATA FOR A GLOBAL NAVIGATION SATELLITE SYSTEM

(75) Inventors: Harald Bochmann, Hanover; Volkmar Tanneberger, Hildesheim, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/369,512

(22) Filed: Aug. 6, 1999

(30) Foreign Application Priority Data

Aug. 14, 1998 (DE) .............................................. 198 36 966

(51) Int. Cl.[7] ...................................................... H04Q 7/32
(52) U.S. Cl. ........................ 455/12.1; 455/13.1; 455/13.4; 455/517; 455/427; 701/214; 701/215; 342/357.01; 342/357.03; 342/357.06; 342/358
(58) Field of Search ................................... 455/456, 457, 455/12.1, 13.1, 427, 403, 422, 428, 429, 430, 517, 500, 13.4, 186.1; 701/214, 215; 342/357.01, 357.02, 357.03, 357.06, 357.12, 358

(56) References Cited

U.S. PATENT DOCUMENTS

| | | | |
|---|---|---|---|
| 5,390,343 | 2/1995 | Rupprecht et al. | ............... 455/186.1 |
| 5,982,324 | * 11/1999 | Watters et al. | .................. 342/357.06 |
| 6,023,239 | * 2/2000 | Kovach | ............................ 342/357.06 |
| 6,085,146 | * 7/2000 | Kuribayashi et al. | ............ 455/186.1 |

FOREIGN PATENT DOCUMENTS

| | | |
|---|---|---|
| 0 769 704 A2 | 4/1997 | (EP) . |
| 0 814 345 A2 | 12/1997 | (EP) . |

* cited by examiner

*Primary Examiner*—William Trost
*Assistant Examiner*—Keith Ferguson
(74) *Attorney, Agent, or Firm*—Michael J. Striker

(57) ABSTRACT

The data receiver device (100) of the present invention for reception of radio signals containing correction data for a global navigation satellite system includes at least two different radio receiving circuits (12,14) operating in three different frequency bands for receiving the radio signals containing the correction data; at least one demodulator (20) for conversion of these radio signals to a baseband; a memory for a frequency table (16) of frequencies of at least two different sources of the radio signals and for a decoding table (26) for decoding the radio signals and at least one decoding device (22) for decoding of the correction data from the radio signals. The at least one decoding device (22) is connected with the at least one demodulator (20) to receive the radio signals from it on the baseband and with the memory (26) for the decoding table for decoding of the radio signals.

17 Claims, 1 Drawing Sheet

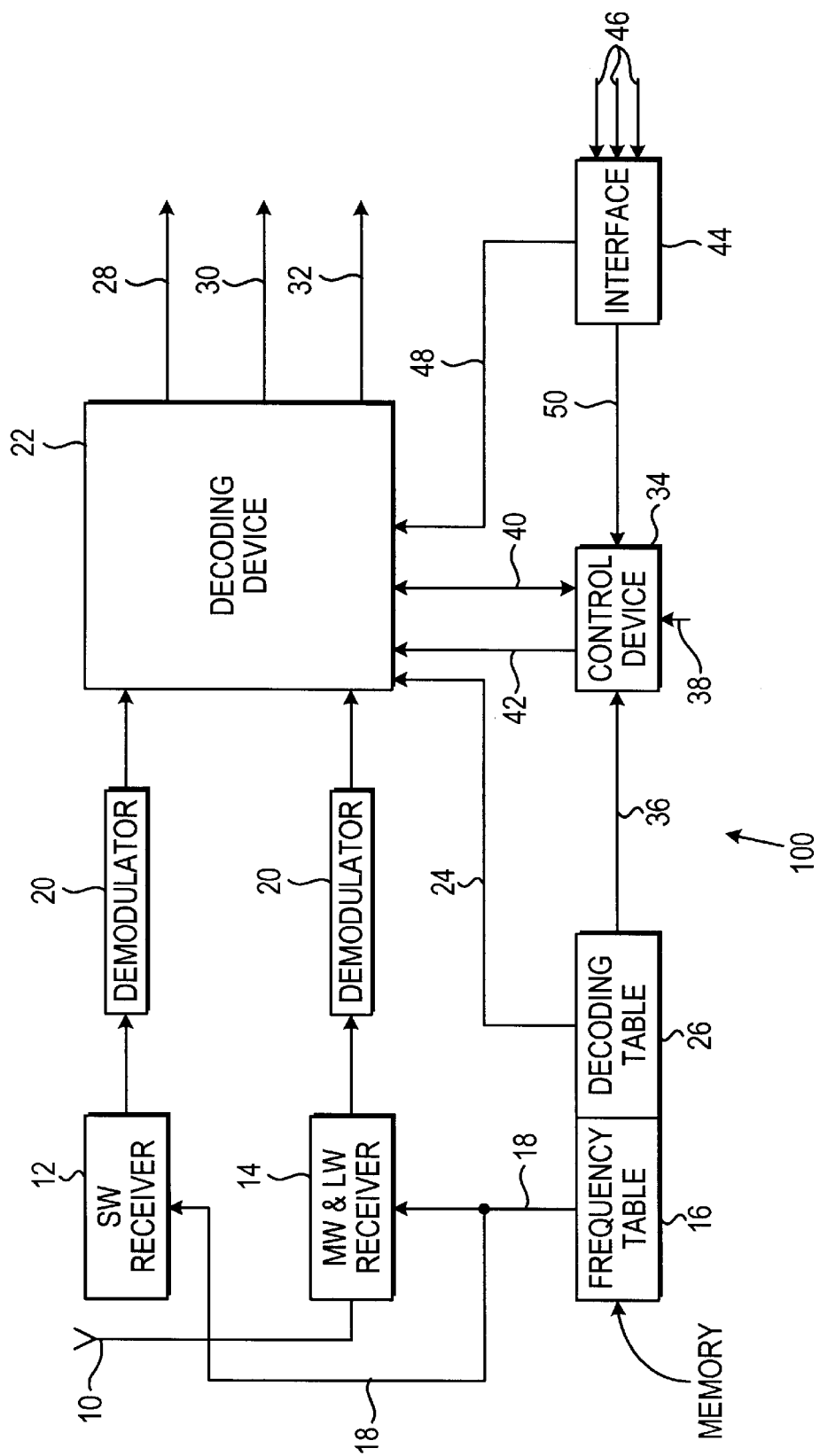

METHOD AND DATA RECEIVER DEVICE FOR RECEPTION OF A RADIO SIGNAL CONTAINING CORRECTION DATA FOR A GLOBAL NAVIGATION SATELLITE SYSTEM

BACKGROUND OF THE INVENTION

1. Field of the Invention

The invention concerns a data receiver device for reception of a broadcast electromagnetic signal containing correction data for a global navigation satellite system (GNSS), especially for a vehicle, motor vehicle, aircraft or seafaring vehicle. The invention also concerns a method of navigation by means of a global navigation satellite system (GNSS), in which differential GNSS data (DGNSS data) are used to correct the GNSS data.

2. Prior Art

A world-wide satellite navigation system, which is designated the global positioning system (GPS) or global navigation satellite system (GLONASS) was built up by the military in the U.S.A. and the former USSR. The GPS and GLONASS systems and further developments of these satellite navigation systems are included in the term, "global navigation satellite system (GNSS)". The precise signals are generally encoded so that an operator obtains an accuracy of about 3 m only by direct use of the method.

Only an uncoded signal with continuously changing artificially poorer position data is available for the civilian user. The resulting poorer accuracy of 100 m is however sufficient for many users. A method has already been suggested with which an accuracy of 3 m is attainable. An additional GNSS receiver is installed at an exactly known position and used as a reference station. The received GNSS position data and the known actual position data are compared with each other in the reference station. The difference is transmitted as correction data to mobile stations by means of a radio signal containing the correction data. All GNSS receivers in the reception area of this radio signal can accordingly correct their positions determined by means of the GNSS data on this basis.

The actual position of the reference station is determined as accurately as possible on the basis of the civilian GNSS signal. This position determined using a carrier phase measurement is very accurate. After a calibration stage permanent correction values are measured and transmitted to the mobile reception apparatus. The mobile reception apparatus receives the GNSS signal automatically and uses the input correction data in order to determine its position. Subsequently the position data is made available for further processing. It can be output on a display screen and/or used for vehicle navigation. This method is called differential GNSS or is abbreviated DGNSS.

Position locating ability is becoming ever more significant with the increasing use of traffic telematic devices and navigation devices in motor vehicles. Position locating receivers are coming into greater use for the NAVASTAR global positioning system (GPS) and the GNSS system, which allow a three-dimensional position determination by transit time measurements to at least four GNSS satellites. As high as possible a positioning accuracy and availability is required of these receivers in the sense of a high system integrity.

A widely used method for increasing accuracy of the GNSS position data is provided by the above-described differential GNSS (DGNSS). In DGNSS correction values from the received satellites are computed by a stationary reference station having a known position and are transmitted in real time by means of a telemetry link to the mobile user. All correlated errors (i.e. the constant error in the region covered by the reference station) can be eliminated by including these correction values in the navigation method in the mobile receiver and thus the accuracy of the GNSS position determination by the mobile user is considerably increased.

Up to now the DGNSS method is predominantly used for geodetic purposes, in which the reference station was operated locally by the user or a users group. A DGNSS service for all of Europe, which would be required for application of the DGNSS method in mass use, has not been available up to now.

Correction data from different DGNSS servers however will be offered in the near future over different transmission channels based on the expected mass use in land, air and water traffic. First attempts have shown that the individual DGNSS services may provide different quality service with different availability because of the different transmission methods (frequency, phase or amplitude modulation) and because of the different transmission frequencies (long wave, medium wave, ultrashort wave).

However it is disadvantageous that the navigation devices based on GNSS use only one source for the radio signal containing the DGNSS data or only a single DGNSS service or only one reference station. Since these services broadcast only locally but do not overlap, GNSS navigation refined by means of DGNSS is available only in certain limited local areas.

SUMMARY OF THE INVENTION

It is an object of the prevent invention to provide an improved data receiver of the above-described kind and an improved method of the above-described kind, in which the above-described disadvantages are eliminated and which provides DGNSS data for GNSS navigation with a greater accuracy over all of Europe.

These objects and others that will be made more apparent hereinafter are provided in a data receiver device for reception of a radio signal containing correction data for a global navigation satellite system (GNSS), especially for a vehicle, motor vehicle, aircraft or seafaring vehicle.

According to the invention the data receiver device includes a frequency table for at least two different sources of the radio signals containing the correction data and a decoder table for decoding the radio signals from the different sources.

This has the advantage that an area-independent input of correction data from as different as possible overlapping sources occurs to provide the GNSS navigation system with a higher accuracy.

Preferred embodiments of this data receiving device or data receiver are described hereinbelow and in the appended claims.

For rapid and delay-free access to the information in the frequency table and the decoding table these tables are stored in a memory in the data receiving device in an advantageous manner.

For further processing of the received correction data a data output for the correction data for connection to a GNSS navigation unit is provided. Furthermore in another preferred embodiment the data receiver is integrated in the GNSS navigation unit.

For greater frequency coverage so that as many different radio signals containing the correction data as possible, and if necessary simultaneously, can be analyzed, at least one radio receiver circuit for at least one frequency band, especially two radio receiver circuits for three different frequency bands, can be provided.

A unified signal processing is obtainable if at least one demodulator is connected to the respective radio receiver circuits to convert the received radio signals to a baseband.

At least one decoding device is connected to the demodulator for decoding correction data from the radio signals in order to decode the correction data from the most different provides, i.e. from the most different radio signals. The decoding device is connected with a means for providing the decoding table, such as a memory, so that it can be supplied with the decoding table. The decoding device appropriately comprises an AM/FM/PM decoder and a data switch.

In a preferred embodiment a central controller is provided for a reliable optimum supply of correction data in a particularly advantageous manner. The controller controls selection of the sources and corresponding radio signals. This central controller includes an input for reception of GNSS position data from a GNSS navigation unit.

An interface is also provided for reception of additional data contained in other radio signals for additional evaluation of further data. In an advantageous manner the interface is connected with an auto radio, a radio telephone and/or a satellite radio telephone and the additional data, e.g., includes DAB (digital audio broadcasting) data, GSM (global system for mobile communications) data or SMS (short message service) data and/or INARSAT data.

Appropriately the correction data includes RS/RASANT data (radio-assisted satellite navigation engineering), AMDS data (amplitude modulated data system), DARC data (method in Japan for data transmission by means of FM sub-carrier, comparable with RDS (radio data system)), LORAN C data (long range navigation, hyperbolic navigation system at 100 kHz) and/or ALF data (accurate positioning by low frequency).

According to the improved method for navigation by means of a global navigation satellite system (GNSS) in which differential GNSS data (DGNSS) data is used to correct the GNSS, at least one radio signal is selected from a list of several known radio signals which contain the correction data and the selected radio signal or signals are decoded to obtain the correction data.

This has the advantage that an area-independent input of correction data from as different as possible overlapping sources occurs to provide the GNSS navigation system with a higher accuracy.

In a preferred embodiment of the method selecting is performed according to a momentary position, distances to sources of the respective radio signals, user fees to be paid to the providers of the respective radio signals and/or signal qualities of the respective radio signals.

In a further preferred embodiment of the invention the decoded DGNSS data is transmitted to a GNSS navigation unit. Advantageously additional data are included or combined with the decoded DGNSS data, which include DAB data (digital audio broadcast data), GSM data (global system for mobile communications data) or SMS data (short message service data) and IMMARSAT data.

BRIEF DESCRIPTION OF THE DRAWING

The objects, features and advantages of the invention will now be illustrated in more detail with the aid of the following description of the preferred embodiments, with reference to the sole FIGURE that is a block diagram of a preferred embodiment of a data receiver device according to the invention.

DESCRIPTION OF THE PREFERRED EMBODIMENTS

The embodiment of the data receiver 100 according to the invention includes a receiving antenna 10 with receiver circuit means connected to it, such as a short wave (SW) receiver circuit means 12 and a medium wave (MW) and long wave (LW) receiver circuit means 14. A frequency table 16 contains transmitter frequencies of known sources of correction data for GNSS position data (global navigation satellite system), for example of so-called reference stations, which compare the GNSS position data obtained from the GNSS with a predetermined position, calculate the appropriate correction data and transmit it by means of a radio signal to another GNSS navigation device. The frequency table 16 inputs the respective frequencies to the radio receiver circuit means 12 and 14, which are set to the respective frequencies as reception frequencies by a link 18 as needed.

The received signal coming from the radio receiver circuit means 12 and 14 is converted in respective demodulators 20 to a baseband and is conducted further to a decoding device 22. This decoding device 22 is designed, for example, for decoding of RDS/RASANT data (radio-assisted satellite navigation engineering), AMDS data (amplitude modulated data system), SWIFT data, DARC data and/or ALF data (accurate positioning by low frequency) and suitable decoded parameters and, if necessary, decoding keys from a decoding table 26 via a decoding data link 24. The decoding device 22 also includes an AM/FM/PM decoder in an advantageous manner so that different signals with the most different modulation methods can be decoded.

Memory means or a memory is provided for both the decoding table 26 and the frequency table 16.

A data switch in the decoding device 22 supplies decoded information on suitable outputs 28, 30 and 32. Thus decoded DGNSS correction data (differential GNSS) are provided, for example, at a first output 28 according to a standard according to RTCM (radio technical commission for maritime services), at a second output 30 as so-called TMC data (traffic message channel and at a third output as a so-called LORAN C data (raw data). These outputs 28, 30 and 32 are, for example, connected with an unshown GNSS navigation device, which processes this data further in a suitable manner and uses it for increasing the accuracy of the GNSS navigation system.

A central control device 34 controls a service selection or transmitter selection and receives data from the decoding table 26 by means of another link 36, GNSS position data from an unshown GNSS navigation receiver by means of a link 38 and quality evaluation data for the respective radio signals containing the data to be decoded via an additional link 40 from the decoding device 22. With the aid of these data the control device 34 controls the decoding device 22 by means of link 42.

An optional additional interface 44 permits reception of external additional data over the inputs 46. This additional data includes, e.g., DAB data (digital audio broadcasting), GSM (global system for mobile communications) or SMS data (short message service) and/or data of the INMARSAT (INMARSAT is an organization which offers a world-wide satellite-assisted data transmission network). These data are received, e.g., from an auto radio, radio telephone or satellite radio telephone. The interface 44 guides these data further to the decoding device 22 via a data link 48. The interface 44 furthermore transmits information regarding the quality of the additional data to the control device 44 over the data link 50, which then controls selection of a suitable service or source and the decoding device 22 based on this information.

According to the invention a combination of the different kinds of data is provided in a new apparatus for improved reception of DGNSS correction data and of additional information, e.g. TMC data or LORAN C navigation data. A DGNSS service or several DGNSS services are selected and decoded by the data receiver 100 based on an evaluation of the signal quality of the available DGNSS data. Other decision criteria, such "different user charges" or "far from the reference station" could also be considered besides the quality criteria. The new data receiver concept permits, as best as possible, nearly European-wide coverage with correction data and a quality-related selection of several DGNSS services by the use of different DGNSS services.

The basic concept of the data receiver 100 is the receipt of DGNSS correction data and additional information with increased availability. All data services available in the short wave band are converted to the fundamental band or baseband and demodulated by means of a short wave reception branch including the short wave front end 12 and the demodulator 20. The front end 12 and demodulator 20 are designed so that a subsequent decoding of the currently known short wave transmission processes, e.g. RDS, SWIFT or DARC is possible. In the same way the data in MW and LW bands is converted into the baseband by means of a medium and long wave reception branch, comprising a MW and LW front end 14 and demodulator 20. The parameterizable decoder 22 subsequently extracts encoded useful information or data from the respective base band signals and, if necessary, makes a decision. The decoder 22 can decode the modulation or data transmission methods of several or all currently operating DGNSS data services available in the short wave, medium wave and long wave bands. These services include RDS/RASANT, SWIFT and DARC in the short wave band, AMDS-DGNSSS in the medium wave and long wave bands and the services ALF and LORAN C/EUROFIX in the long wave band (art word, method for data transmission developed by TU delft). Future services for transmission of DGNSS correction data can be integrated by suitable parameter implementation techniques in the decoding and frequency tables 16,26 in the apparatus 100.

The controller 34 evaluates the signal and data quality or also the occurring user charge of the momentarily available DGNSS correction data services and selects one or more services for reception. A list of actually receivable services is taken care of in the controller 34, so that switching to another available service occurs immediately when there is interference or spurious signals on the momentarily received services and thus a satisfactory availability of the DGNSS correction data is guaranteed.

The parameters required for decoding and, if necessary, encoding of the basic available DGNSS correction data are stored in the decoding table 26. The frequency table 16 contains the frequencies available in the observed frequency bands of the available frequencies of the DGNSS services. For example, a dynamic expansion of the frequency table is provided in order to add new frequencies which are desired or unintentionally detected during operation of the data receiver device 100.

The data receiver device 100 supplies DGNSS correction data to a following GNSS satellite navigation receiver for further processing at its outputs 28, 30 and 32. Additional useful data, which can be superposed on the data of the different DGNSS correction services, are similarly input, e.g. by means of the serial interface 44. This additional data can be e.g. data of the traffic message channel (with RDS/RASANT) or LORAN C navigation data (with LORAN C/EUROFIX), which is made available for the controlling application.

In an alternative embodiment reference to other data services than those in frequency bands already mentioned is conceivable, e.g. digital audio broadcasting (DAB), satellite radio (INMARASAT) or mobile radio (GSM) and special short message service (SMS). In this embodiment information suitable for quality evaluation in the controller is generated from the respective input signals by means of a suitably designed interface. If the DGNSS correction data of one of these external receivers is selected, the decoder/data switch 22 switches it through to the output interface of the data receiver device 100. An integration of this receiver as an additional receiver branch in the data receiver 100 described here is possible using future engineering methods.

Furthermore in another alternative embodiment it is possible to double or multiply the short wave or medium wave/long wave receiver branches 12,14. Because of that a diversity or operation of a background receiver is possible. Using a background receiver additional receivable DGNSS services can be sought in the background while DGNSS correction data is received in an uninterrupted manner in the foreground receiver apparatus, so that a very current list of actually receivable DGNSS services is present in the controller 34.

It is also conceivable that the connected GNSS receiver to which the DGNSS correction data is supplied, returns the actually calculated position to the data receiver device 100 (via link 38), so that geographic criteria can be considered in selecting the suitable DGNSS correction data service. In this embodiment the geographic position of the transmission or reference station is supplied to the tables in the data receiver device 100 besides the transmission frequency.

The data receiver device 100 described here for reception of DGNSS correction data and additional information with increased availability can contain all or only several of the above-mentioned features. A highly integrated design using modern engineering and methods of digital signal processing is conceivable.

The disclosure in German Patent Application 198 36 966.2 of Aug. 14, 1998 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in a method and data receiver device for reception of a radio signal containing correction data for a global navigation satellite system, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. A data receiver device for reception of radio signals containing correction data for a global navigation satellite system, said data receiver device comprising a frequency table of frequencies of at least two different sources of said radio signals; and a decoding table for said radio signals from said at least two different sources of said radio signals.

2. The data receiver device as defined in claim 1, further comprising a memory for the frequency table and for decoding table.

3. The data receiver device as defined in claim 2, further comprising at least one radio receiving circuit operating in at least one frequency band for receiving said radio signals containing said correction data.

4. The data receiver device as defined in claim 3, further comprising at least one demodulator for conversion of said radio signals received by said at least one radio receiving circuit to a basedband.

5. The data receiver device as defined in claim 3, further comprising an interface for input of additional data contained in other radio signals.

6. The data receiver device as defined in claim 5, further comprising an auto radio, a radio telephone or a satellite radio telephone connected with said interface and wherein said other radio signals include at least one of digital audio broadcasting data, global system for mobile communications data, short message service data and organization offering a world-wide satellite-assisted data transmission network.

7. The data receiver device as defined in claim 2, further comprising at least two different radio receiving circuits operating in three different frequency bands for receiving said radio signals containing said correction data.

8. The data receiver device as defined in claim 1, further comprising data outputs for the correction data for connection to a Global Navigation Satellite System navigation device.

9. The data receiver device as defined in claim 1, further comprising an integrated Global Navigation Satellite System navigation device.

10. The data receiver device as defined in claim 1, further comprising a central controller for controlling selection of a respective one of said sources of said radio signals and a respective one of said radio signals.

11. The data receiver device as defined in claim 1, for a vehicle, a motor vehicle, an aircraft or a seafaring vehicle.

12. The data receiver device defined in claim 1, wherein said correction data includes radio-assisted satellite navigation engineering data, amplitude modulated data system data, system for wireless infotainment forwarding and teledistribution data, a data radio channel data, long range navigation data, hyperbolic navigation of 100 kHz data.

13. A data receiver device for reception of radio signals containing correction data for a Global Navigation Satellite System, said data receiver device comprising a frequency table of frequencies of at least two different sources of said radio signals; a decoding table for said radio signals from said at least two different sources of said radio signals; a memory for the frequency table and for decoding table; at least one radio receiving circuit operating in at least one frequency band for receiving said radio signals containing said correction data, at least one demodulator for conversion of said radio signals received by said at least one radio receiving circuit to a basedband; and at least one decoding device for decoding of said correction data from said radio signals received by said at least one radio receiving circuit, and wherein said at least one decoding device is connected with said memory for the decoding table and with said demodulator.

14. The data receiver device as defined in claim 13, wherein said at least one decoding device includes an AM/FM/PM decoder and a data switch.

15. A data receiver device for reception of radio signals containing correction data for a Global Navigation Satellite System, said data receiver device comprising a frequency table of frequencies of at least two different sources of said radio signals; a decoding table for said radio signals from said at least two different sources of said radio signals; and a central controller having an input for receiving Global Navigation Satellite System position data from a Global Navigation Satellite System navigation unit.

16. A data receiver device for reception of radio signals containing correction data for a global navigation satellite system, said data receiver device comprising at least two different radio receiving circuits operating in three different frequency bands for receiving said radio signals containing said correction data; at least one demodulator for conversion of said radio signals received by said at least one radio receiving circuit to a baseband; memory means for a frequency table of frequencies of at least two different sources of said radio signals and for a decoding table for said radio signals from said at least two different sources of said radio signals; and at least one decoding device for decoding of said correction data from said radio signals received by said at least one radio receiving circuit, said at least one decoding device is connected with said demodulator to receive said radio signals therefrom on said baseband and with said means for providing said decoding table for decoding of said radio signals.

17. A method for navigation by means of a global navigation satellite system, said method comprising the steps of using a data receiver device for reception of radio signals containing correction data for a Global Navigation Satellite System; using in the device a frequency table of frequencies of at least two different sources of said radio signals; and using in the device decoding table for radio-signals from said at least two different sources of said radio signals.

* * * * *